United States Patent [19]

Illes, Jr.

[11] 4,020,980
[45] May 3, 1977

[54] VOLUMETRIC FEEDER

[75] Inventor: Charles P. Illes, Jr., Chattanooga, Tenn.

[73] Assignee: Flow Star Industries Inc., Chattanooga, Tenn.

[22] Filed: Mar. 3, 1976

[21] Appl. No.: 663,321

[52] U.S. Cl. .............................................. 222/411
[51] Int. Cl.² ...................................... G01F 11/20
[58] Field of Search ......................... 222/411, 410

[56] References Cited

UNITED STATES PATENTS

| 735,281 | 8/1903 | Mitchell | 222/411 X |
| 746,410 | 12/1903 | Turner | 222/411 X |
| 1,751,335 | 3/1930 | Kennedy | 222/411 X |

FOREIGN PATENTS OR APPLICATIONS

| 1,072,847 | 6/1967 | United Kingdom | 222/411 |

Primary Examiner—Stanley H. Tollberg
Assistant Examiner—Hadd Lane
Attorney, Agent, or Firm—Seidel, Gonda & Goldhammer

[57] ABSTRACT

A gravity assisted feeder is disclosed for feeding flowable solids by means of a rotating blade disposed below a stationary cone. Rotation of the blade causes the solids to move inwardly along the blade to a discharge port adjacent the axis of rotation of the blade.

12 Claims, 6 Drawing Figures

VOLUMETRIC FEEDER

BACKGROUND

It is believed that the subject matter of this application is classified in class 222/441. For relevant prior art, see U.S. Pat. Nos. 1,914,162; 1,751,335; 3,804,303; and 3,036,745. For other art of interest wherein the blade does not rotate about a fixed axis, see U.S. Pat. No. 3,809,286. It is believed that none of the feeders in said patents are truly volumetric feeders wherein a predicatable amount of solids are uniformly fed per unit time.

The apparatus of the present invention for feeding flowable solids includes a housing adapted to be attached to a storage vessel. The housing includes a discharge port adjacent a lower end therof. A cone is supported by the housing with the lower periphery of the cone above the elevation of said port.

The housing supports at least one feeder blade for feeding solids from within the housing to said port. A means is provided to support the blade for rotation in one direction about the axis of said discharge port with the blade at an elevation below the elevation of said periphery of said cone. The blade has an outer end on which is attached the curved tip portion. The curved tip portion preferably extends outwardly beyond the periphery of the cone and is curved in the direction of rotation to feed solids inwardly to the discharge port.

The blade has an upright fin secured thereto and extending from a location adjacent the tip portion to a location adjacent the discharge port. The height of the fin is greater than the thickness of the tip portion. The outermost end of the fin is coextensive with the innermost end of the tip portion to form a substantially continuous surface for moving solids inwardly to the discharge port as the blade rotates.

In addition to providing positive volumetric feeding, the apparatus of the present invention has a high feed capacity and improves the feeding of low density hard-flowing solids such as bran rice hulls, cut plastic film, as well as aerated solids that have a tendency to flow like a liquid.

It is an object of the present invention to provide a novel apparatus for feeding flowable solids.

It is another object of the present invention to provide apparatus for feeding flowable solids wherein a predictable amount of solids are uniformly fed per unit time.

It is another object of the present invention to provide a volumetric feeder having improved feeding of materials which heretofore have been difficult to feed.

Other objects will appear hereinafter.

For the purpose of illustrating the invention, there is shown in the drawings a form which is presently preferred; it being understood, however, that this invention is not limited to the precise arrangement and instrumentalities shown.

Referring to the drawing in detail, wherein like numerals indicate like elements, there is shown in FIG. 1 a feeder in accordance with the present invention designated generally as 10.

Figure 3:
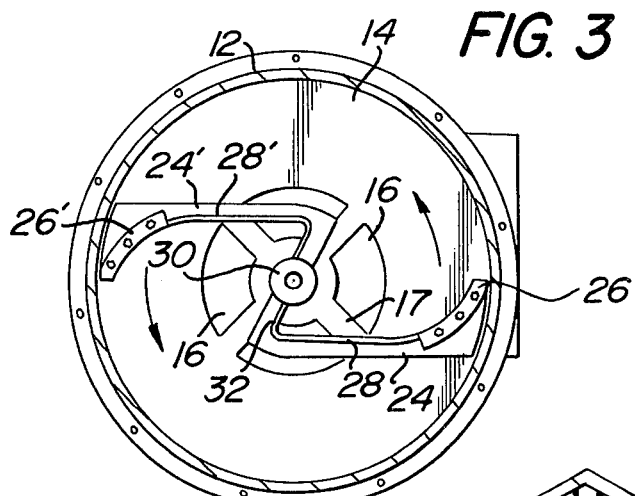
FIG. 3 is a sectional view taken along the line 3—3 in FIG. 2 but on a reduced scale.

The feeder 10 includes an upright generally cylindrical housing 12 having a flat base plate 14 at its lower end. The base plate 14 is provided with a discharge port 16 which may be in the form of a plurality of segment 16 as shown in FIG. 3. The segments 16 are defined by webs 17.

An inverted cone 18 is supported by the housing 12 in any suitable manner such by struts 20. The cone 18 preferably has a downwardly extending peripheral rim which acts as a flow guide in conjunction with the inner periphery of the housing 12 as will be made clear hereinafter. A blade 24 is provided for feeding flowable solids from a location immediately outwardly from the rim 22 of the cone 18 and inwardly to the discharge port 16.

The blade 24 may be a single blade or as shown more clearly in FIG. 3, a double wherein one portion is designated 24 and the mating oppositely disposed portion is designated 24'. Only blade 24 will be described in detail with corresponding elements having corresponding primed numerals on the blade 24'.

The blade 24 is a flat blade which slides over base plate 14 and is preferably made from any one of the wide variety of suitably hardened metals. A tip portion 26 is secured to the upper surface of the blade 24 adjacent the outer end thereof immediately adjacent to the outer periphery of flat base plate 14. The tip portion 26 is preferably removably secured to the blade 24 by threaded fasteners so that any one of a variety of different tip portions having different thicknesses may be substituted for one another to thereby vary the "bite" into the flowable soilds. Blade 24 is rotated about the axis of the discharge port 16 in a single direction as indicated by the arrows in FIG. 3 and tip portion 26 is curved in that direction.

Figure 1:
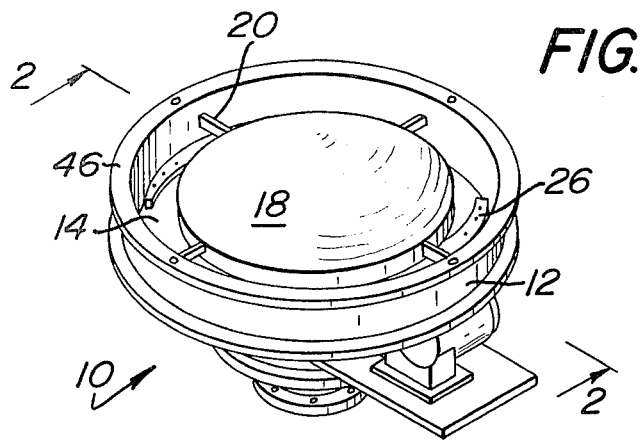
FIG. 1 is a perspective view of a feeder in accordance with a first embodiment of the present invention.
Figure 2:
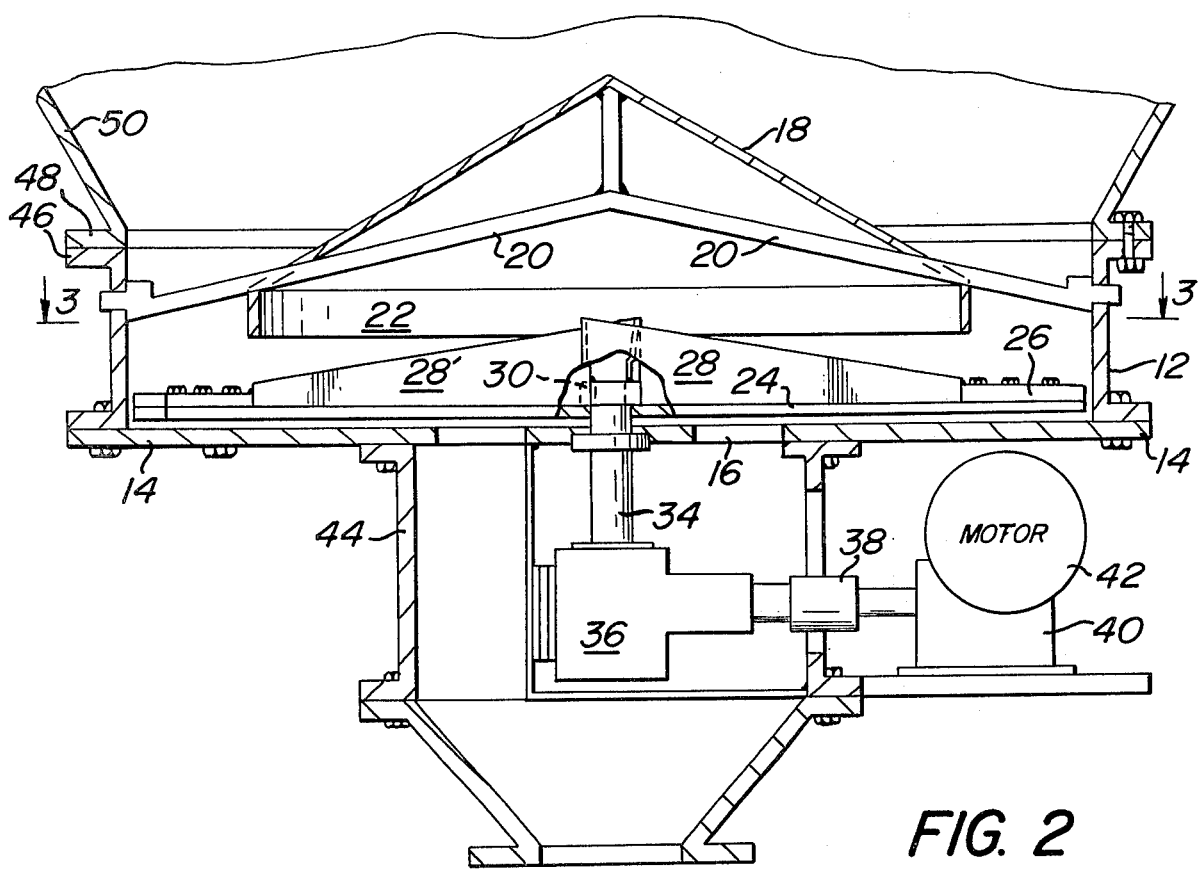
FIG. 2 is a sectional view taken along the line 2—2 in FIG. 1 but on an enlarged scale.

An upstanding fin 28 is provided on the leading edge of the blade 24. The fin 28 extends from the tip portion 26 to the hub 30. Fin 28 includes a radially outwardly disposed portion 32 extending from the hub with the height of the fin 28 being greatest at or adjacent the discharge port 16. See FIG. 2 wherein the upper surface of the blade 28 tapers downwardly to the tip portion 26. The fin 28 forms a continuation of the feeding surface on the tip portion 26.

A shaft 34 is provided concentric with the discharge port 16 and extends upwardly through a hole in a portion of the web 17 and through the hub 30. A retainer or fastener may be secured to the upper end of the shaft 34. Shaft 34 drives the blades 24, 24' so that they rotate in one direction such as counterclockwise in FIG. 3.

The lower end of shaft 34 is coupled to a right angle gear box 36. A shaft extends horizontally out of the gear box 36, through a coupling 38, to the gear reducer 40 which is driven by motor 42. The motor 42, gear reducer 40, and gear box 36 are supported by suitable brackets on the discharge chute 44. Chute 44 is coxial with the discharge port 16 and is removably secured to the base plate 14.

The upper end of the housing 12 is provided with a radially outwardly directed flange 46 which facilitates removably bolting the feeder 10 to the lower end of a vessel 50. Vessel 50 is a storage vessel such as a silo or the like. Flowable solids disposed within vessel 50 are fed by the apparatus 10 at a predictable rate per unit time. The flowable solids descend downwardly into the annular space between the outer periphery of rib 22 and the inner periphery of the housing 12. If necessary or desired, cone 18 may be vibrated to facilitate flow.

The tip portion 26 preferably extends beyond the periphery of the rib 22 and "bites" into the flowable solids which are at their angle of repose. Tip portion 26 and blade 24 need only extend out to the periphery of flat base plate 14. The solids move inwardly along the periphery of tip portion 26 and inwardly along the fin 28 to the discharge port 16. Solids which flow downwardly by gravity through the discharge port 16 discharge from the chute 44 onto a conveyor, into a container, or the like.

The cone 18 establishes an angle of repose with the base plate 14 to thereby prevent flushing of solids through the discharge port 16. The height of the cone 18 from the base plate 14 serves as a flow governor. That is, the greater the height, the greater the amount of material that may be drawn in by the feeder blade 24, 24'. The cone 18 also serves as a distributor in that it forces the flowable solids in vessel 50 to the outer perimeter of the base plate 14 thereby limiting the area from which the solids may be fed. Such distribution of the solids also enchances flow and prevents flushing of the solids through the discharge port 16.

The fin 28 insures positive feed of the material to the discharge port 16. The height of the fin 28 serves as a flow limit stop thereby prohibiting flowable solids from moving onto the upper surface of the blade 24 from either side of the blade 24 which would contribute to non-uniform flow. The single direction of rotation of the blade 24 produces a constant, non-pulsing feed rate. As a result thereof, the feed rate is predictable at various rotational speeds of the blade 24.

It will be noted that substantially all of the blade 24 lies beneath the cone 18 with only the tip portion 26 extending beyond the periphery of the cone 18. This reduces the amount of vertical forces exerted by the flowable material in the vessel 50 which must be counteracted by the force for rotating blade 24. As a result therof, the horsepower and torque requirements for rotating the blade 24 are reduced to an economical level. Wear on the feeder blade 24 and the base plate 14 may be minimized by providing hardened surfaces on those elements. Motor 42 is an electric motor. However, air motors or hydraulic motors may be utilized if desired. The discharge angle of chute 44 may be varied as desired. It will be noted that the cone 18 is supported by the housing 12 independently from the blade 24 which is supported by the base plate 14 and shaft 34.

Figure 4:
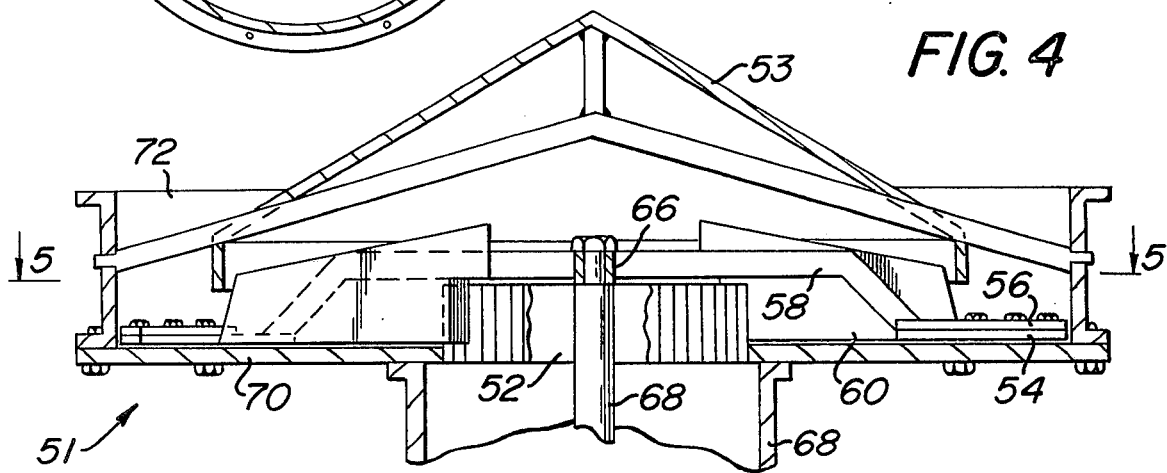
FIG. 4 is a sectional view to that of FIG. 2 but illustrating another embodiment of the present invention.
Figure 5:
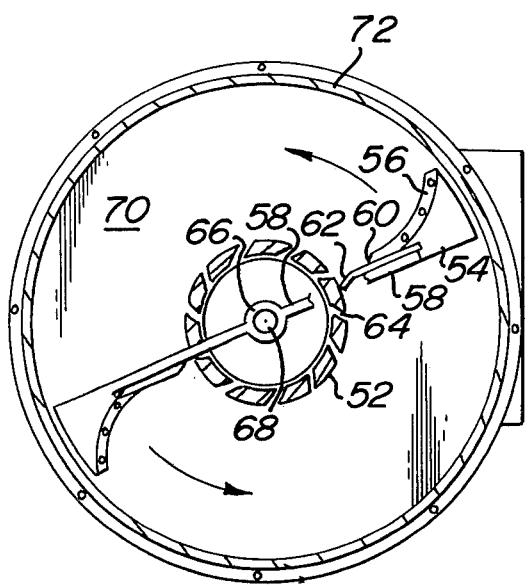
FIG. 5 is a sectional view taken along the line 5—5 in FIG. 4 but on a reduced scale.

In FIGS. 4 and 5, there is illustrated another embodiment of the feeder of the present invention designated generally as 51. The feeder 51 is identical with feeder 50 except as will be made clear hereinafter. Feeder 51 includes a cone 53 comparable to cone 18 and supported in substantially the identical manner as cone 18. A flood ring 52 surrounds the discharge port. Flood ring 52 is a vertically disposed cylindrical member having a plurality of angularly disposed slots through which the material must be feed in order to discharge from within the housing of the feeder 51.

The feeder blade 54 has a curved tip portion 56 secured to the upper surface thereof. An arm 58 interconnects the blade 54 with a hub 66 removably connected to the upper end of drive shaft 68. The fin 60 increases in height as shown more clearly in FIG. 4 and terminates at its inner end in an angularly disposed deflector 62. Deflector 62 as it rotates is adapted to push material such as the flowable solids through the slots 64 on the flood ring 52. It will be noted from FIG. 5, that the slots 64 are not radially disposed, but rather extend along a chord of the cylindrical flood ring 52.

A cylindrical or other configured chute 68 is removably secured to the base plate 70 of the housing 72 so as to be coaxial with the discharge port and the flood ring 52. The feeder 51 is particularly adapted for feeding flowable solids which have been aerated and thus having the tendency to flush or flow like a liquid. The flood ring 54 acts as a dam and prevents any natural flushing of the solids. The deflector 62 on the fin 60 acts as a wiper to feed the solids through the slots 64.

Figure 6:
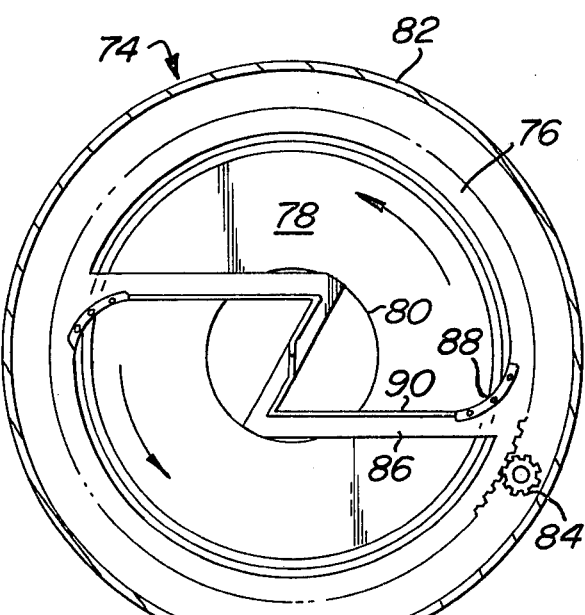
FIG. 6 is a view similar to FIG. 3 but illustrating still another embodiment of the present invention.

In FIG. 6, there is illustrated another feeder in accordance with the present invention designated generally as 74. The feeder 74 is identical with the feeder 10 except as will be made clear hereinafter. A gear 76 is mounted for rotation about the axis of the discharge port 80 in the base plate 78 on the housing 82. A pinion 84 is meshed with the outer peripheral surface of gear 76. Pinion 84 is connected to a motor not shown.

At least one blade 86 extends inwardly from the inner periphery of gear 76. A curved portion 82 is secured to the upper surface of blade 86. A fin 90 is provided in the same manner as fin 28 in apparatus 10. Gear 76 is provided with suitable bearings so as to maintain its access of rotation about the axis of discharge port 80.

With respect to the feeders 10 and 74, it will be noted that the blade and fin thereon have a radially disposed portion connected to a straight portion forming a chord with respect to the discharge port. The straight portions of the double blades in each embodiment are parallel to each other.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a vessel for storing flowable solids, a feeder for feeding said solids from said vessel said feeder being connected to said vessel and having a discharge port, said feeder having at least one feeder blade for feeding solids from within the housing to said discharge port, said feeder supporting said blade for rotation in one direction about the axis of said port, a cone supported above said blade, said blade having a curved tip portion attached to an outer end and extending outwardly beyond the periphery of said cone, an upright fin secured to said blade and extending from a location adjacent the tip portion of the blade to a location adjacent said discharge port, the height of the fin being greater than the thickness of said tip portion, the outermost end of said fin being substantially coextensive with the innermost end of said tip portion to form a continuous surface for moving solids inwardly to said port as said blade rotates, said blade being a flat horizontally disposed blade with the fin upright along the one side edge of the blade which is the leading edge in the direction of rotation of the blade.

2. Apparatus in accordance with claim 1 including two such blades interconnected adjacent the axis of rotation, each blade having a portion which extends across a part of the discharge port to the outer periphery of the discharge port.

3. Apparatus for feeding flowable solids comprising:
   a. a housing, a base plate having means defining a discharge port in said plate, said plate being adjacent the lower end of a vertical wall of said housing,
   b. a cone supported by said housing, said cone having its lower periphery within said housing above the elevation of said port and radially inward of said housing wall,
   c. at least one horizontally disposed feeder blade generally parallel to said base plate for feeding solids from within said housing to said port, said blade overlying said plate and being supported for rotation in one direction about the axis of said port at an elevation below the elevation of said periphery of said cone, said blade having an outer end adjacent said housing wall, a tip portion removably attached to the upper surface of said blade radially outwardly of the lower periphery of said cone, said tip portion being curved at its leading edge in the direction of rotation to feed solids inwardly towards said port,
   d. an upright fin secured to said blade adjacent its leading edge and extending from a location adjacent said tip portion to a location adjacent said port, the height of said fin being greater than the thickness of said tip portion, the height of said fin adjacent said port being greater than the height of said fin adjacent said tip portion, the outer end of said fin being coextensive with the inner end of said tip portion to form a substantially continuous surface for moving solids inwardly to said port as said blade rotates.

4. Apparatus in accordance with claim 3 including a flange on the upper end of said housing for removably securing the housing to a storage vessel, and a chute connected to said housing, said chute surrounding said discharge port, the apex of said cone being at an elevation above the elevation of said flange.

5. Apparatus in accordance with claim 3 including a stationary slotted flood ring coaxial with said port and radially inwardly of said fin, said fin having a portion adjacent the outer periphery of said ring for deflecting solids through the slots of said ring.

6. Apparatus in accordance with claim 5 wherein said slots in said ring lie along a chord of the ring so as to be non-radially disposed.

7. Apparatus in accordance with claim 3 including two such blades connected together adjacent the axis of rotation thereof radially inwardly of the periphery of said port, said blades extending nearly opposite one another for rotation as a unit.

8. Apparatus in accordance with claim 7 including a gear connected to the outer end of said blades, and a driving pinion in mesh with teeth on the outer periphery of said gear.

9. Apparatus in accordance with claim 7 wherein each blade has a portion which is radially disposed and connected to a straight portion, each of said portions having said fin thereon, the straight portions being radially inwardly from the tip portion and generally parallel to each other.

10. Apparatus in accordance with claim 3 including a drive shaft at the axis of rotation of said blade, said blade being connected to the upper end of said shaft, the lower end of said shaft being connected to a speed reducer driven by a motor.

11. Apparatus comprising a housing adapted to be removably connected to the lower end of a vessel for storing flowable solids, said housing having a base plate at its lower end, said base plate being provided with a discharge port, a feeder for feeding solids from within the housing to said discharge port, said feeder including two blades with each blade extending from one end of a central portion so as to be generally Z-shaped, said blades being supported for rotation in one direction about an upright axis, a cone supported by said housing above said blades with the lower edge of the cone being spaced from the base plate, said blades being generally flat and overlying said base plate for sliding movement thereon, the leading edge of each blade being curved, said blades having an outer end extending beyond the periphery of said cone, an upright fin secured to said blades along the leading edge of the blades in the direction of rotation of the blades, the height of the fins being progressively higher in a direction from said outer end of the blades toward said axis of rotation, the entirety of said fins being radially inwardly of said cone periphery, a drive shaft at the axis of rotation of said blades, said shaft having an upper end terminating within said housing, said central portion being connected to the upper end of said shaft, said shaft having a lower end below the elevation of said base plate, a drive motor and speed reducer for driving said shaft, said motor and speed reducer being connected to the lower end of said shaft, and a chute coaxial with said shaft, said chute being connected to said base plate and circumscribing said port.

12. Apparatus in accordance with claim 11 including a plurality of said ports disposed around said shaft upper end, each blade passing over each port during one revolution.

* * * * *